United States Patent
Sato

(10) Patent No.: US 9,106,140 B2
(45) Date of Patent: Aug. 11, 2015

(54) DC/DC CONVERTER

(71) Applicant: ROHM CO., LTD., Kyoto (JP)

(72) Inventor: Yoshinori Sato, Kyoto (JP)

(73) Assignee: ROHM CO., LTD. (JP)

( * ) Notice: Subject to any disclaimer, the term of this patent is extended or adjusted under 35 U.S.C. 154(b) by 162 days.

(21) Appl. No.: 13/934,560

(22) Filed: Jul. 3, 2013

(65) Prior Publication Data

US 2014/0160803 A1      Jun. 12, 2014

(30) Foreign Application Priority Data

Jul. 5, 2012    (JP) .................................. 2012-151922

(51) Int. Cl.
*H02M 3/335* (2006.01)
*H02M 1/00* (2007.01)

(52) U.S. Cl.
CPC .. *H02M 3/33507* (2013.01); *H02M 2001/0038* (2013.01)

(58) Field of Classification Search
USPC .......... 363/21.02–21.04, 21.08, 21.12, 21.15, 363/21.16
See application file for complete search history.

(56) References Cited

U.S. PATENT DOCUMENTS

| | | | |
|---|---|---|---|
| 2004/0263140 A1* | 12/2004 | Adragna et al. | 323/282 |
| 2005/0213355 A1* | 9/2005 | Koike | 363/21.16 |
| 2007/0121258 A1* | 5/2007 | Hachiya | 361/18 |
| 2007/0121352 A1* | 5/2007 | Yang et al. | 363/21.15 |
| 2010/0315838 A1* | 12/2010 | Mao et al. | 363/16 |
| 2011/0182088 A1* | 7/2011 | Lidak et al. | 363/21.12 |
| 2011/0305053 A1* | 12/2011 | Lin et al. | 363/95 |

FOREIGN PATENT DOCUMENTS

| | | |
|---|---|---|
| JP | 2-211055 A | 8/1990 |
| JP | 9-98571 A | 4/1997 |

* cited by examiner

*Primary Examiner* — Adolf Berhane
*Assistant Examiner* — Henry Lee, III
(74) *Attorney, Agent, or Firm* — Cantor Colburn LLP

(57) ABSTRACT

A ZT comparator is configured to compare a voltage $V_{ZT}$ at a ZT terminal with a predetermined threshold voltage $V_{TH\_BOTTOM}$, and to generate a bottom detection signal. A bottom count controller is configured to determine a count setting value based on an ON/OFF time which is a period of time from the time point at which a pulse signal $S_{PWM}$ transits to an on level that corresponds to the on state of a switching transistor up to the time point at which a bottom detection signal is first asserted, and based on the input voltage level of the DC/DC converter. Furthermore, the bottom count controller is configured to assert a set signal $S_{SET}$ every time the number of times the bottom detection signal is asserted reaches the count setting value.

6 Claims, 11 Drawing Sheets

DC/DC CONVERTER

BACKGROUND OF THE INVENTION

Cross Reference to Related Applications

The present invention claims priority under 35 U.S.C. §119 to Japanese Application No. 2012-151922 filed Jul. 5, 2012, the entire content of which is incorporated herein by reference.

1. Field of the Invention

The present invention relates to a DC/DC converter.

2. Description of the Related Art

Various kinds of consumer electronics devices such as TVs, refrigerators, etc., are each configured to operate receiving commercial AC electric power from an external circuit. Also, electronic devices such as laptop computers, cellular phone terminals, and PDAs (Personal Digital Assistants) are each configured to operate using commercial AC electric power, and/or to be capable of charging a built-in battery using such commercial AC electric power. Such consumer electronics devices and electronic devices (which will collectively be referred to as "electronic devices" hereafter) each include a built-in power supply apparatus (inverter) configured to perform AC/DC conversion of commercial AC voltage. Alternatively, such an inverter is configured as a built-in component included within an external power supply adapter (AC adapter) for such an electronic device.

Related techniques are disclosed in Japanese Patent Application Laid-Open No. H09-098571, and Japanese Patent Application Laid-Open No. H02-211055, for example.

FIG. 1 is a block diagram showing a basic configuration of an inverter. An inverter 1r mainly includes a fuse 2, an input capacitor Ci, a filter 4, a diode rectifier circuit 6, a smoothing capacitor Cs, and a DC/DC converter 10r.

The commercial AC voltage $V_{AC}$ is input to the filter 4 via the fuse 2 and the input capacitor Ci. The filter 4 is configured to remove noise included in the commercial AC voltage $V_{AC}$. The diode rectifier circuit 6 is configured as a diode bridge circuit configured to perform full-wave rectification of the commercial AC voltage $V_{AC}$. The output voltage of the diode rectifier circuit 6 is smoothed by the smoothing capacitor Cs, thereby generating a converted DC voltage $V_{IN}$.

An insulated DC/DC converter 10r is configured to receive the DC voltage $V_{IN}$ via an input terminal P1, to step down the DC voltage $V_{IN}$ thus received, and to supply an output voltage $V_{OUT}$ stabilized to the target value to a load (not shown) connected to an output terminal P2.

The DC/DC converter 10r includes a control circuit 100r, a switching transistor M1, an output circuit 200, and a feedback circuit 210. The output circuit 200 includes a transformer T1, a first diode D1, a first output capacitor Co1, a detection resistor $R_S$, a first diode D1, and a second output capacitor Co2. The output circuit 200 has a typical topology, and accordingly, detailed description thereof will be omitted.

The switching transistor M1 is configured to perform switching so as to step down the input voltage $V_{IN}$, thereby generating the output voltage $V_{OUT}$. Furthermore, by adjusting the duty ratio of the switching performed by the switching transistor M1, the control circuit 100r is configured to stabilize the output voltage $V_{OUT}$ to a target value, and to control a coil current Ip that flows through a primary winding W1 of the transformer T1.

The detection resistor $R_S$ is arranged in series with the primary winding W1 of the transformer T1 and the switching transistor M1. A voltage drop (detection voltage) $V_{CS}$, which is proportional to the current Ip that flows through the primary winding W1 and the switching transistor M1, develops at the detection resistor $R_S$. The control circuit 100r is configured to control, based on the detection voltage $V_{CS}$, the current Ip that flows through the primary winding W1.

The feedback circuit 210 is configured to generate a feedback voltage $V_{FB}$ that corresponds to the output voltage $V_{OUT}$, and to supply the feedback voltage $V_{FB}$ thus generated to a feedback terminal (FB terminal) of the control circuit 100r. The feedback circuit 210 includes a shunt regulator 212 and a photocoupler 214. The shunt regulator 212 is configured to generate a feedback signal S11 having a level adjusted such that the difference between the output voltage $V_{OUT}$ and a predetermined target value becomes zero, and to supply the feedback signal S11 thus generated to a light-emitting diode of the photocoupler 214. A phototransistor (or otherwise a phototransistor) of the photocoupler 214 is configured to convert a light signal S12 received from the light-emitting diode into the feedback voltage $V_{FB}$ that corresponds to the feedback signal S11.

On the primary winding side, the transformer T1 includes an auxiliary winding W3, in addition to the primary winding W1. The auxiliary winding W3, a second diode D2, and a second output capacitor Co2 form a second DC/DC converter. At the second output capacitor Co2, a DC voltage $V_{CC}$ develops according to the switching performed by the switching transistor M1. The DC voltage $V_{CC}$ is supplied to a power supply terminal VCC (VCC terminal) of the control circuit 100r.

The control circuit 100r includes a pulse modulator. The control circuit 100r is configured to generate a pulse signal (switching output) $S_{OUT}$ which is repeatedly switched between an on level that corresponds to the on state of the switching transistor M1 and an off level that corresponds to the off state of the switching transistor M1. Furthermore, the control circuit 100r is configured to supply the switching output $S_{OUT}$ to the gate of the switching transistor M1. By adjusting the duty ratio of the switching output $S_{OUT}$, such an arrangement is capable of stabilizing the output voltage $V_{OUT}$ to the target value.

FIG. 2 is a waveform diagram showing the operation of the DC/DC converter 10r shown in FIG. 1.

When the switching output $S_{OUT}$ is switched to the on level (high level) at the time point t0, the switching transistor M1 is turned on. In this state, the current Ip starts to flow through the switching transistor M1 and the primary winding W1. The current Ip increases at a constant rate over time, together with which the detection voltage $V_{CS}$ increases.

At the time point t1, the detection voltage $V_{CS}$ reaches a predetermined voltage. In other words, the current Ip reaches the peak current $Ip_{PEAK}$. The pulse modulator of the control circuit 100r is configured to assert the reset signal $S_{RST}$ when the detection voltage $V_{CS}$ reaches the predetermined voltage. When the reset signal $S_{RST}$ is asserted, the switching output $S_{OUT}$ is switched to the off level, which turns off the switching transistor M1. During the on period of the switching transistor M1, energy is stored in the transformer T1.

When the switching transistor M1 is turned off, current flows through the secondary winding W2 and the first diode D1, which charges the first output capacitor Co1. The energy stored in the transformer T1 is discharged by means of the charging current. When the energy stored in the transformer T1 becomes zero at the time point t2, the control circuit 100r asserts the set signal $S_{SET}$, which switches the switching output $S_{OUT}$ to the on level again. The control circuit 100r is configured to repeatedly perform the aforementioned operation.

Description will be made regarding the generation of the set signal SSET by the control circuit 100r. When the switching transistor M1 is turned off, the drain of the switching transistor M1 is set to a high-impedance state. During the period in which energy remains stored in the transformer T1, the drain voltage $V_P$ of the switching transistor M1 remains at the high level voltage.

The combination of the primary winding W1 of the transformer T1 and the drain-source capacitance $C_{DS}$ forms a resonance circuit. After the energy stored in the transformer T1 becomes zero, by means of the resonance circuit thus formed, the drain voltage $V_P$ of the switching transistor M1 begins to oscillate.

From the viewpoint of energy efficiency, the switching transistor M1 may be turned on at a desired timing after the drain voltage $V_P$ starts to oscillate. However, if the switching transistor M1 is turned on at a timing at which the drain voltage $V_P$ is high, such an arrangement leads to a problem of noise. In order to solve such a problem, the control circuit 100r is configured to detect the drain voltage $V_P$ decreasing to the vicinity of zero (which will be referred to as "bottom detection"), and to turn on the switching output OUT to the on level at this detection timing so as to again turn on the switching transistor M1.

The voltage $V_D$ at one end of the auxiliary winding W3 is proportional to the drain voltage $V_P$ of the switching transistor M1. The electric potential $V_D$ at the aforementioned one end of the auxiliary winding W3 is divided by the resistors $R_{ZT1}$ and $R_{ZT2}$, and the electric potential thus divided is input to an auxiliary terminal (ZT terminal). A capacitor $C_{ZT}$ is connected to the ZT terminal.

The control circuit 100r is configured to monitor the electric potential $V_{ZT}$ so as to perform bottom detection. Specifically, the control circuit 100r is configured to generate a bottom detection signal BOTTOM_DET which is asserted when the voltage $V_{ZT}$ at the ZT terminal becomes equal to or smaller than a predetermined threshold value. In addition to the bottom detection signal BOTTOM_DET, the control circuit 100r is configured to generate a set mask signal SET_MASK. The set mask signal SET_MASK is generated in order to override the bottom detection signal BOTTOM_DET immediately after the energy stored in the transformer T1 becomes zero. The set mask signal SET_MASK is asserted (set to high level) when a predetermined set mask time $\tau_{SET\_MASK}$ elapses after the set mask signal SET_MASK is asserted. The control circuit 100r is configured to assert the set signal $S_{SET}$ when the bottom detection signal BOTTOM_DET is asserted after the set mask signal SET_MASK is asserted.

The period of time from the time point at which the switching output $S_{OUT}$ is switched to on level up to the time point at which the bottom detection signal BOTTOM_DET is first asserted will be refereed to as the "ON/OFF time" hereafter. The ON/OFF time changes depending on the input voltage $V_{IN}$ of the DC/DC converter 10r and the load of the DC/DC converter 10r. Accordingly, in a case in which the set mask time $\tau_{SET\_MASK}$ is configured as a constant value, the number of pulses of the bottom detection signal BOTTOM_DET masked by the set mask signal SET_MASK changes due to a change in the input voltage $V_{IN}$, and due to a change in the load.

This means that the timing at which the set signal $S_{SET}$ is asserted changes due to a change in the input voltage $V_{IN}$ and due to a change in the load. Thus, this means that the switching frequency of the switching transistor M1 changes due to a change in the input voltage $V_{IN}$ and due to a change in the load.

If a frequency component of the audible band occurs due to a change in the switching frequency, this leads to a problem of acoustic noise occurring in the transformer.

SUMMARY OF THE INVENTION

As a countermeasure with respect to the aforementioned problem, the present inventor has investigated a comparison technique in which the number of times the bottom detection signal BOTTOM_DET is asserted is counted (which will also be referred to as the "bottom count"), and the set signal $S_{SET}$ is asserted after a predetermined bottom count is detected.

FIG. 3 is a diagram showing the relation between the ON/OFF time and the bottom count setting. In the comparison technique, the bottom count setting is changed according to the length of the ON/OFF time. Such an arrangement is capable of suppressing a change in the switching frequency, thereby reducing acoustic noise occurring in the transformer. In order to allow the circuit to operate stably, the adjustment of the bottom count setting is configured to have hysteresis. FIG. 4 is a waveform diagram showing the operation of the control circuit 100r configured to operate using the bottom count setting.

The inverter 1r can be used in different environments, e.g., in the 100 V system in which $V_{AC}$=100 V and in the 200 V system in which $V_{AC}$=200 V. FIG. 5A is a diagram showing the relation between the switching frequency and the secondary-side electric power of the DC/DC converter used in the 100 V system. FIG. 5B is a diagram showing the relation between the switching frequency and the secondary-side electric power of the DC/DC converter used in the 200 V system. If the control circuit 100r is designed to be optimized for the 100 V system, such an arrangement has the following problem. That is to say, in a case in which the control circuit 100r is used in the 200 V system, the control circuit 100r thus optimized involves an extremely high switching frequency when a light load is connected to the control circuit 100r. This leads to increased standby power consumption. Furthermore, in some cases, such an arrangement has a problem in that the switching frequency exceeds the standard noise terminal voltage frequency of 150 kHz.

The present invention has been made in order to solve such a problem. Accordingly, it is an exemplary purpose of an embodiment of the present invention to provide a DC/DC converter which can be employed in various kinds of environments.

An embodiment of the present invention relates to a control circuit for a DC/DC converter. The DC/DC converter comprises: a transformer comprising a primary winding, a secondary winding, and an auxiliary winding; a switching transistor arranged on a current path of the primary winding of the transformer; and a detection resistor arranged on a path of the switching transistor. The control circuit comprises: a feedback terminal configured to receive a feedback voltage that corresponds to an output voltage of the DC/DC converter; a current detection terminal configured to receive a detection voltage that develops at the detection resister; an auxiliary terminal configured to receive, as an input signal, a voltage at one end of the auxiliary winding; a pulse modulator configured to generate a pulse signal having a duty ratio that is adjusted according to the voltage at the aforementioned one end of the auxiliary winding, the detection voltage, and the feedback voltage, such that an output voltage of the DC/DC converter approaches a target value; and a driver configured to perform switching of the switching transistor according to the pulse signal. The pulse modulator comprises: a reset signal generating unit configured to generate a reset signal which is asserted according to the feedback voltage and the detection voltage; and a set signal generating unit configured to generate a set signal which is asserted according to the voltage at the auxiliary terminal. The pulse modulator is configured to generate a pulse signal which is switched to an on level that corresponds to an on state of the switching transistor when the set signal is asserted, and which is switched to an off level that corresponds to an off state of the switching transistor when the reset signal is asserted. The set signal generating unit comprises: a bottom detection comparator configured to compare the voltage at the auxiliary terminal with a predetermined threshold voltage, and to generate a bottom detection signal which is asserted every time the voltage at the auxiliary terminal crosses the threshold voltage; and a bottom count controller configured to determine a count setting value based on an ON/OFF time which is a period of time from a time point at which the pulse signal transits to the on level that corresponds to the on state of the switching transistor up to a time point at which the bottom detection signal is first asserted, and based on an input voltage level of the DC/DC converter, and to assert the set signal every time the number of times the bottom detection signal is asserted reaches the count setting value.

With such an embodiment, the bottom count setting is changed according to the input voltage and the ON/OFF time. Thus, such an arrangement is capable of maintaining the switching frequency at a constant level regardless of the input voltage level and the state of the load.

Also, the control circuit may be configured such that it is monolithically integrated on a single semiconductor substrate.

Examples of such a "monolithically integrated" arrangement include: an arrangement in which all the circuit components are formed on a semiconductor substrate; and an arrangement in which principal circuit components are monolithically integrated. Also, a part of circuit components such as resistors and capacitors may be arranged in the form of components external to such a semiconductor substrate in order to adjust the circuit constants. By integrating such a control circuit in the form of a single IC (Integrated Circuit), such an arrangement provides a reduced circuit area while maintaining improved uniformity of the circuit element characteristics.

Another embodiment of the present invention relates to a DC/DC converter. The DC/DC converter comprises: a transformer comprising a primary winding, a secondary winding, and an auxiliary winding; a switching transistor connected to the primary winding of the transformer; a first diode arranged such that its anode is connected to the secondary winding; a first output capacitor having its one electrode grounded and its other electrode connected to the cathode of the first diode; a second diode arranged such that its anode is connected to the auxiliary winding; a second output capacitor having its one electrode grounded and its other electrode connected to the cathode of the second diode; a feedback circuit configured to generate a feedback voltage that corresponds to an output voltage that develops at the first output capacitor; and the aforementioned control circuit configured to receive the feedback voltage, and to perform switching of the switching transistor.

Also, the feedback circuit may comprise: a shunt regulator configured to generate a feedback signal having a level that is adjusted such that the difference between a voltage obtained by dividing the output voltage and a predetermined target value becomes zero; and a photocoupler comprising a primary-side light-emitting element configured to be controlled according to the feedback signal. Also, a signal generated by a secondary-side element of the photocoupler may be supplied as the feedback voltage to the control circuit.

Yet another embodiment of the present invention relates to a power supply apparatus. The power supply apparatus comprises: a filter configured to perform filtering of a commercial AC voltage; a diode rectifier circuit configured to perform full-wave rectification of an output voltage of the filter; a smoothing capacitor configured to smooth an output voltage of the diode rectifier circuit, so as to generate a DC input voltage; and the aforementioned DC/DC converter configured to step down the DC input voltage, and to supply the DC input voltage thus stepped down to a load.

Yet another embodiment of the present invention relates to an electronic device. The electronic device comprises: a load; a filter configured to perform filtering of a commercial AC voltage; a diode rectifier circuit configured to perform full-wave rectification of an output voltage of the filter; a smoothing capacitor configured to smooth an output voltage of the diode rectifier circuit, so as to generate a DC input voltage; and the aforementioned DC/DC converter configured to step down the DC input voltage, and to supply the DC input voltage thus stepped down to the load.

Yet another embodiment of the present invention relates to an AC adapter. The AC adapter comprises: a filter configured to perform filtering of a commercial AC voltage; a diode rectifier circuit configured to perform full-wave rectification of an output voltage of the filter; a smoothing capacitor configured to smooth an output voltage of the diode rectifier circuit, so as to generate a DC input voltage; and the aforementioned DC/DC converter configured to step down the DC input voltage so as to generate the DC output voltage.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
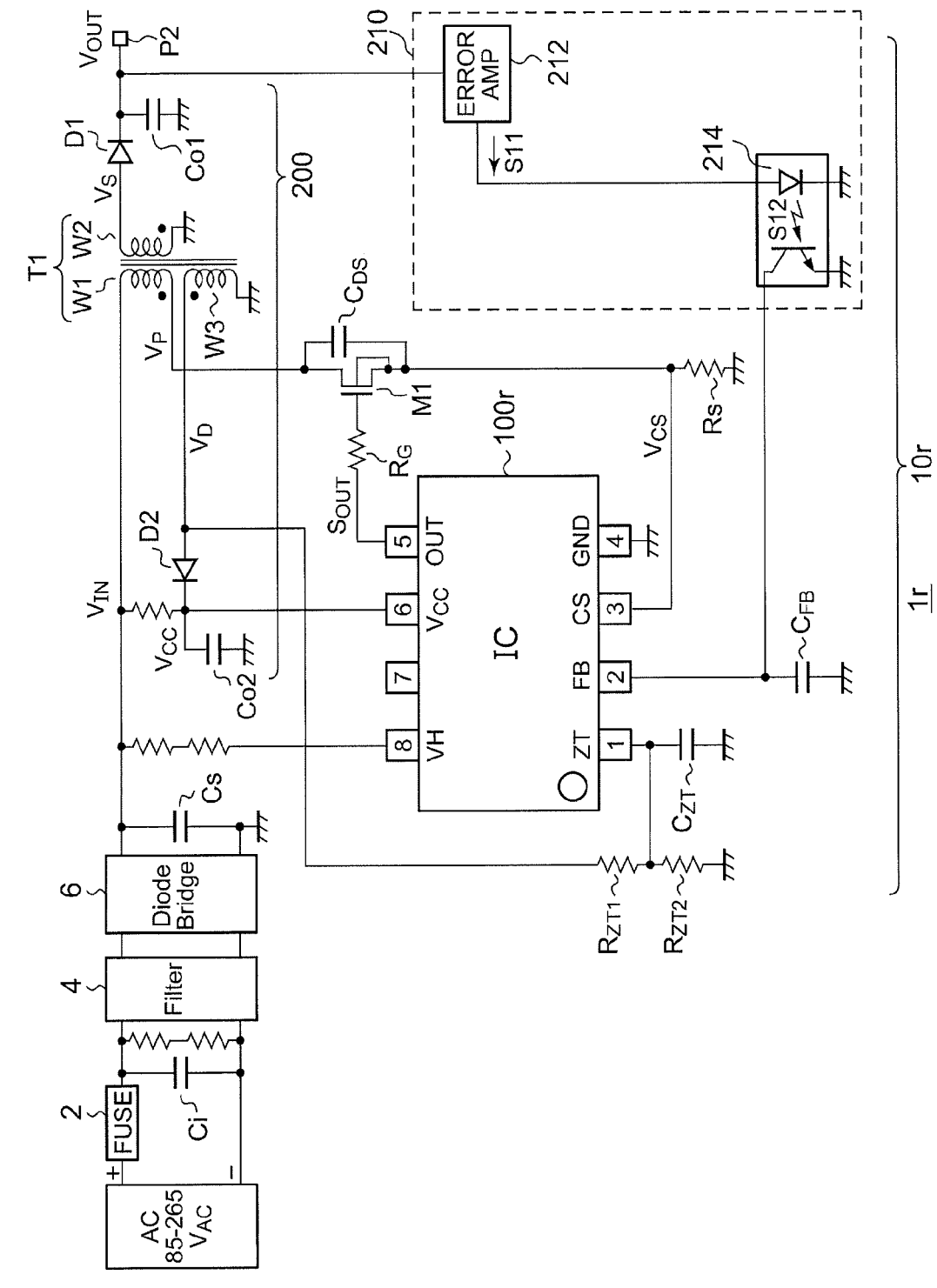
FIG. 1 is a block diagram showing a basic configuration of an inverter.
Figure 2:
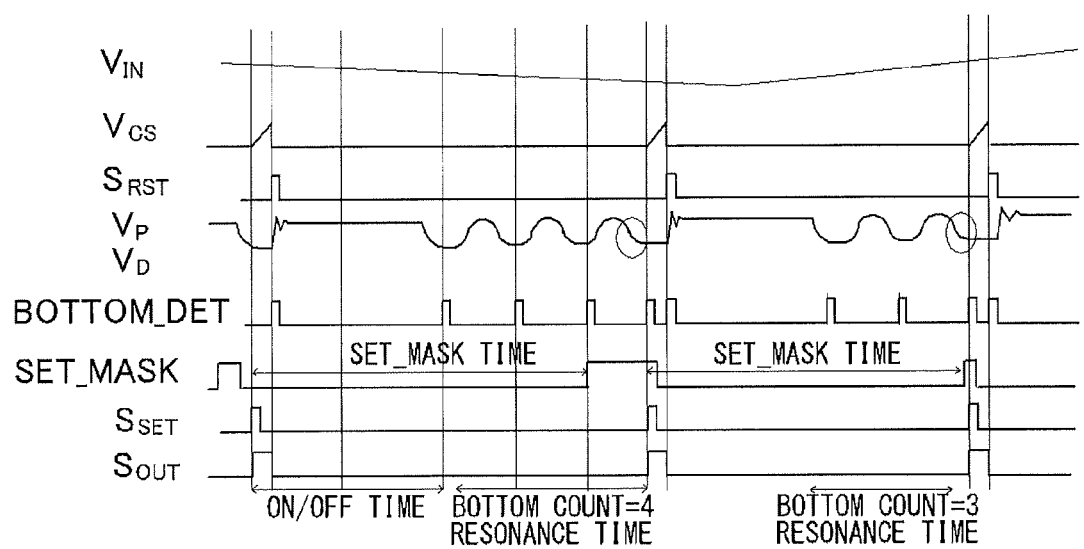
FIG. 2 is a waveform diagram showing the operation of a DC/DC converter shown in FIG. 1.
Figure 3:
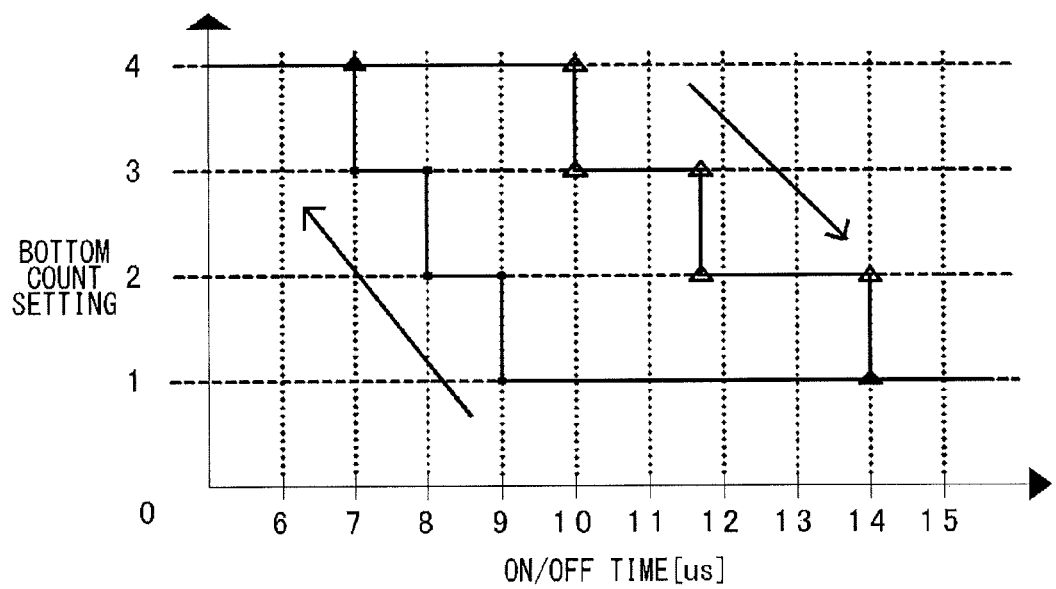
FIG. 3 is a diagram showing the relation between the ON/OFF time and the bottom count.
Figure 4:
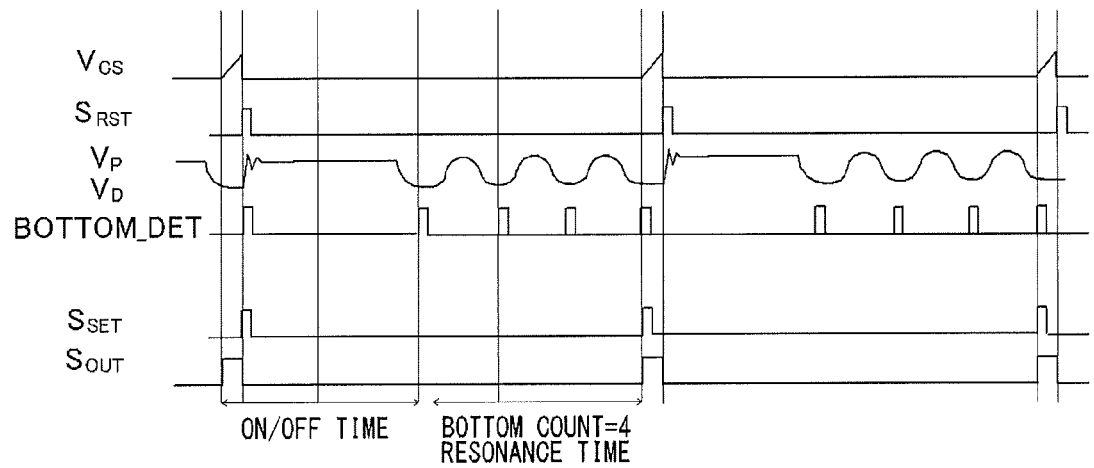
FIG. 4 is a waveform diagram showing the operation of a control circuit using the bottom counting.
Figure 5A:
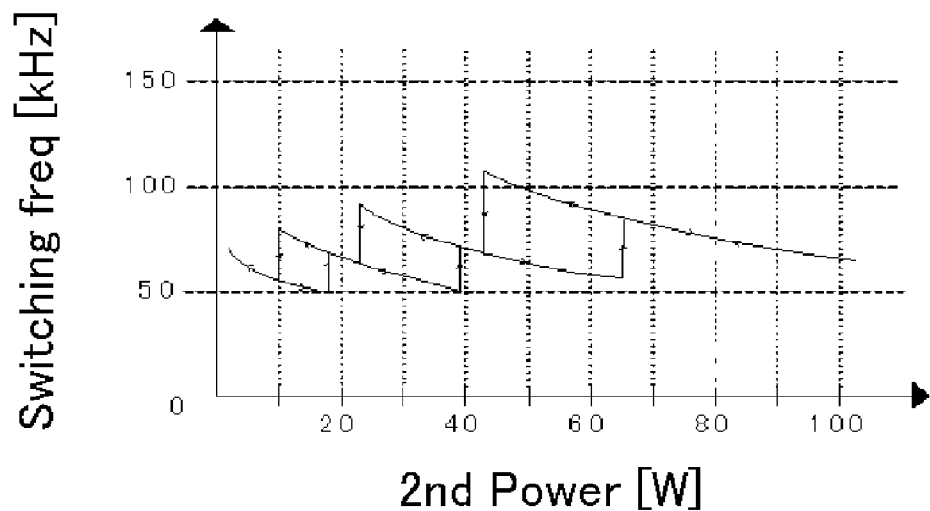
FIGS. 5A and 5B are diagrams showing the relation between the switching frequency and the secondary-side electric power of the DC/DC converter used in the 100 V system and the 200 V system, respectively.
Figure 5B:
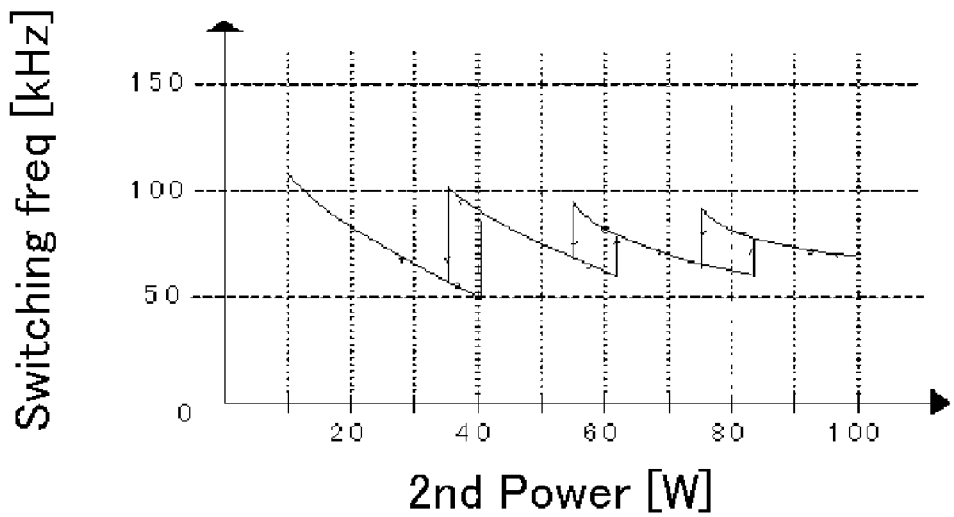

The invention will now be described based on preferred embodiments which do not intend to limit the scope of the present invention but exemplify the invention. All of the features and the combinations thereof described in the embodiment are not necessarily essential to the invention.

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is connected to the member B" includes a state in which the member A is indirectly connected to the member B via another member that does not affect the electric connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not affect the electric connection therebetween, in addition to a state in which the member A is directly connected to the member C, or the member B is directly connected to the member C.

Figure 6:
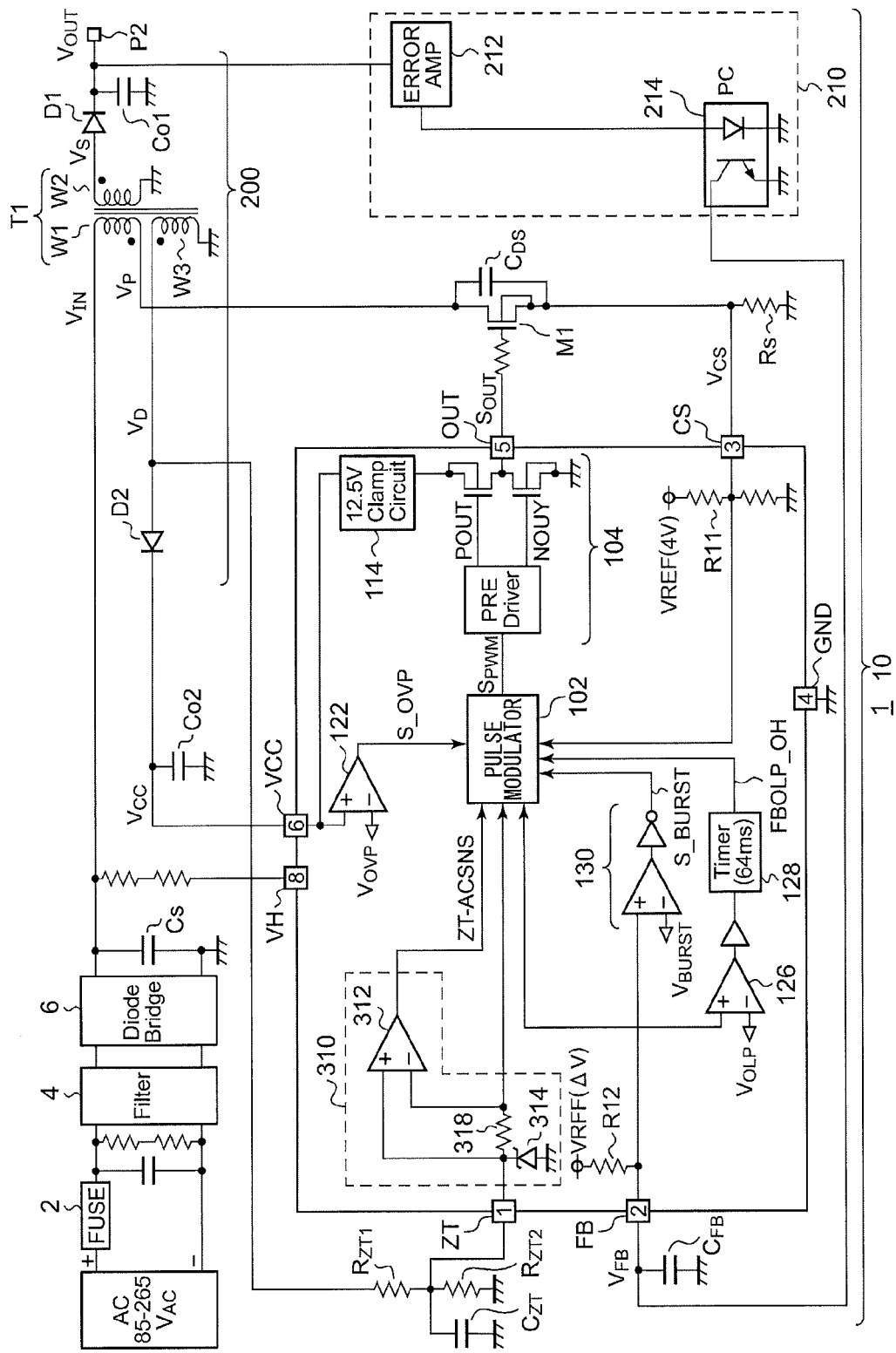
FIG. 6 is a circuit diagram showing a configuration of an inverter including a DC/DC converter including a control circuit according to an embodiment.

FIG. 6 is a circuit diagram showing a configuration of an inverter 1 including a DC/DC converter 10 including a control circuit according to an embodiment.

The DC/DC converter 10 includes a control circuit 100, a switching transistor M1, a detection resistor $R_S$, an output circuit 200, and a feedback circuit 210. The control circuit 100 has the same configuration as that shown in FIG. 1 except for the configuration of the control circuit 100. Accordingly, description thereof will be omitted.

Description will be made regarding the configuration of the control circuit 100.

The control circuit 100 is configured as a function IC monolithically integrated on a single semiconductor substrate. The control circuit 100 includes a ZT terminal, an FB terminal, a CS terminal, a GND terminal, an OUT terminal, a VCC terminal, and a VH terminal.

The control circuit 100 is configured to adjust the duty ratio of the switching operation of the switching transistor M1 included in the DC/DC converter 10 according to the detection voltage $V_{CS}$ at the CS terminal and the feedback voltage $V_{FB}$ at the FB terminal, so as to stabilize the DC output voltage $V_{OUT}$ to a target level. It should be noted that the switching transistor M1 may be integrated in the control circuit 100.

The control circuit 100 includes a pulse modulator 102, a driver 104, an input voltage detection circuit 310, a clamp circuit 114, an edge blanking circuit 115, an overvoltage protection comparator 122, an overload protection comparator 126, a filter 128, and a burst comparator 130.

A resistor R11 is arranged between the CS terminal and a predetermined high level voltage terminal VREF. In a case in which an open fault occurs in the detection resistor $R_S$, the CS terminal is pulled up to the high level voltage via the resistor R11. Furthermore, a resistor R12 is arranged between the FB terminal and the high level voltage terminal VREF.

The pulse modulator 102 is configured to generate a pulse signal $S_{PWM}$ having a duty ratio that is adjusted such that the output voltage $V_{OUT}$ of the DC/DC converter 10 approaches the target value. The pulse modulator 102 is configured to switch the pulse signal $S_{PWM}$ to a level (off level) that corresponds to the off state of the switching transistor M1 according to the detection voltage $V_{CS}$ that develops at the CS terminal. Furthermore, the pulse modulator 102 is configured to switch the pulse signal $S_{PWM}$ to a level (on level) that corresponds to the on state of the switching transistor M1 according to the voltage $V_{ZT}$ at the ZT terminal.

The driver 104 is configured to perform switching of the switching transistor M1 according to the pulse signal $S_{PWM}$. For example, the driver 104 includes a pre-driver 104a, and transistors 104b and 104c.

The clamp circuit 114 is provided in order to clamp the high level of the output voltage of the driver 104, i.e., to clamp the high level of the gate voltage $V_G$ of the switching transistor M1 to a level lower than a predetermined level. By providing the clamp circuit 114, such an arrangement allows the user to employ a switching transistor having a low gate breakdown voltage as the switching transistor M1.

Furthermore, the switching performed by the switching transistor M1 requires charging/discharging of the gate capacitance of the switching transistor M1. By limiting the amplitude of the gate voltage $V_G$ by means of the clamp circuit 114, such an arrangement allows the charging current and the discharging current to be reduced, thereby providing reduced power consumption of the control circuit 100.

The overvoltage protection comparator 122 is configured to compare the power supply voltage $V_{CC}$ with a predetermined threshold value $V_{OVP}$ (e.g., 27.5 V), and to generate an overvoltage protection (OVP) signal S_OVP which is asserted (set to high level) when $V_{CC} > V_{OVP}$. For example, when the state in which the OVP signal S_OVP is asserted continues for a duration of 100 μs or more, the control circuit 100 is configured to suspend the switching performed by the switching transistor M1.

When the load connected to the output terminal P2 is heavy, i.e., in the overload state in which the output current is large, the output voltage $V_{OUT}$ decreases, and the feedback voltage $V_{FB}$ rises. The overload protection comparator 126 is configured to compare the feedback voltage $V_{FB}$ with the threshold value $V_{OLP}$, and to generate an overload protection (OLP) signal S_OLP which is asserted (set to high level) when $V_{FB} > V_{OLP}$. The OLP signal S_OLP is subjected to filtering by means of the filter 128 which has a predetermined time constant (e.g., 64 ms). When the state in which the OVP signal S_OVP is asserted continues for a duration of 64 ms or more, an FBOLP_OH signal is asserted. In this state, the control circuit 100 is configured to suspend the switching operation of the switching transistor M1. Subsequently, after a predetermined period of time (e.g., 512 ms) elapses, the control circuit 100 is configured to restore the switching performed by the switching transistor M1.

When the load connected to the output terminal P2 is light, i.e., in the light load state in which the output current is small, the output voltage $V_{OUT}$ rises, which reduces the feedback voltage $V_{FB}$. The burst comparator 130 is configured to compare the feedback voltage $V_{FB}$ with a threshold value $V_{BURST}$, and to generate an light load detection signal S_BURST which is asserted (set to high level) when $V_{FB}<V_{BURST}$. When the light load detection signal S_BURST is asserted, the control circuit 100 is configured to suspend the switching performed by the switching transistor M1.

The input voltage detection circuit 310 is configured to detect the level of the input voltage $V_{IN}$ of the DC/DC converter 10. The input voltage detection circuit 310 is configured to detect, with regard to the use environment of the inverter 1, whether the inverter 1 is used in the AC 100 V system or in the AC 200 V system. The input voltage detection circuit 310 is configured to generate an input voltage detection signal ZT_ACSNS (which will also be referred to as the "ZT_ACSNS signal" hereafter) having a level which is switched to a first level (e.g., high level) for the AC 100 V system, and which is switched to a second level (e.g., low level) for the AC 200 V system.

With the present embodiment, the input voltage detection circuit 310 is configured to judge the input voltage level based on the voltage $V_{ZT}$ at the ZT terminal. The input voltage detection circuit 310 includes a comparator 312, a diode 314, and a resistor 318. The comparator 312 is configured to compare the voltage at one end of the resistor 318 with the voltage at the other end of the resistor 318, so as to generate the ZT_ACSNS signal.

It should be noted that the detection method employed by the input voltage detection circuit 310 for detecting the input voltage $V_{IN}$ is not restricted in particular. Also, known techniques may be employed. For example, the input voltage detection circuit 310 may be configured to judge the level of the input voltage $V_{IN}$ based on the input voltage $V_{IN}$ input to the VH terminal.

Figure 7:
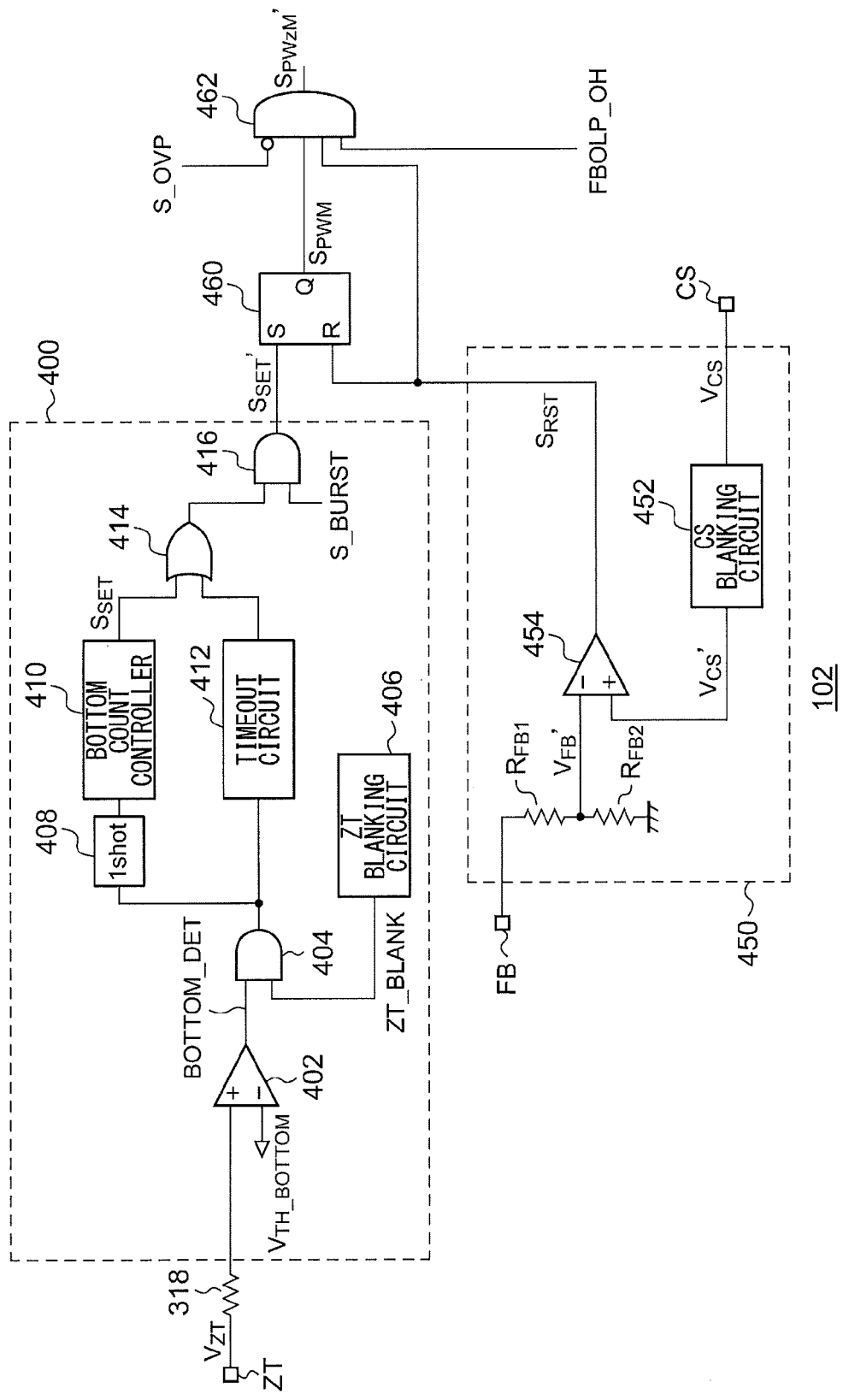
FIG. 7 is a circuit diagram showing a specific configuration of a pulse modulator.

FIG. 7 is a circuit diagram showing a specific configuration of the pulse modulator 102. The pulse modulator 102 is configured as a so-called peak current mode modulator. The pulse modulator 102 includes a set signal generating unit 400, a reset signal generating unit 450, an SR flip-flop 460, and an AND gate 462.

The reset signal generating unit 450 is configured to generate the reset signal $S_{RST}$ according to the feedback voltage $V_{FB}$ at the FB terminal and the detection voltage $V_{CS}$ at the CS terminal. The feedback signal $V_{FB}$ is divided by means of resistors $R_{FB1}$ and $R_{FB2}$. It should be noted that the resistors $R_{FB1}$ and $R_{FB2}$ may be omitted.

The CS blanking circuit 452 is provided in order to remove noise in the detection voltage $V_{CS}$. Specifically, the CS blanking circuit 452 is configured to mask the detection voltage $V_{CS}$ during a predetermined blanking time immediately after the switching transistor M1 is turned on. Also, the CS blanking circuit 452 may be omitted.

The CS comparator 454 is configured to compare the detection voltage $V_{CS}'$ with the feedback voltage $V_{FB}'$, and to generate the reset signal $S_{RST}$ which is asserted when $V_{CS}$ becomes greater than $V_{FB}$.

The set signal generating unit 400 is configured to generate the set signal $S_{SET}'$ according to the electric potential $V_{ZT}$ at the ZT terminal. The set signal generating unit 400 includes a bottom detection comparator 402, an AND gate 404, a ZT blanking circuit 406, a one-shot circuit 408, a bottom count controller 410, a timeout circuit 412, an OR gate 414, and an AND gate 416.

The bottom detection (ZT) comparator 402 is configured to compare the voltage $V_{ZT}$ with a threshold voltage $V_{TH\_BOTTOM}$ which is in the vicinity of 0 V, and to generate the bottom detection signal BOTTOM_DET which is asserted when $V_{ZT}<V_{TH\_BOTTOM}$. The threshold voltage $V_{TH\_BOTTOM}$ may be set to a voltage level on the order of 100 mV or 200 mV.

Immediately after the switching transistor M1 is turned off, the voltage $V_{ZT}$ swings greatly. In some cases, this leads to a false bottom detection, in spite of energy continuing to remain in the transformer T1. In order to solve such a problem of a false bottom detection, the AND gate 404 and the ZT blanking circuit 406 are provided. The ZT blanking circuit 406 is configured to generate a blanking signal ZT_BLANK which is set to low level during a predetermined blanking period after the switching output OUT is switched from the on level to the off level, and which is set to high level after the predetermined blanking period elapses. The AND gate 404 is configured to mask the bottom detection signal BOTTOM_DET received from the bottom detection comparator 402 using the blanking signal ZT_BLANK.

The bottom detection signal BOTTOM_DET output from the AND gate 404 is asserted every time the voltage $V_{ZT}$ at the ZT terminal falls to the bottom level after the switching transistor M1 is turned off.

In some cases, the bottom detection signal BOTTOM_DET' has an extremely narrow pulse width. In order to allow the downstream circuit to operate normally in a sure manner, the one-shot circuit 408 is provided. The one-shot circuit 408 is configured to stabilize the bottom detection signal BOTTOM_DET' to have a predetermined pulse width.

The bottom count controller 410 is configured to count the number of times the bottom detection signal BOTTOM_DET generated by the bottom detection comparator 402 is asserted (the bottom count). With such an arrangement, when the bottom count reaches a setting value COUNT_SET, the bottom detection comparator 402 is configured to assert the set signal $S_{SET}$.

The bottom detection comparator 402 is configured to receive, as an input signal, the input voltage detection signal ZT_ACSNS received from the input voltage detection circuit 310. Furthermore, the bottom detection comparator 402 is configured to measure the ON/OFF time which is a period of time from the time point at which the switching transistor M1 is turned on up to the time point at which the bottom detection signal BOTTOM_DET is asserted.

The bottom detection comparator 402 is configured to switch the setting value COUNT_SET according to the ON/OFF time and the input voltage detection signal ZT_ACSNS.

Figure 8A:
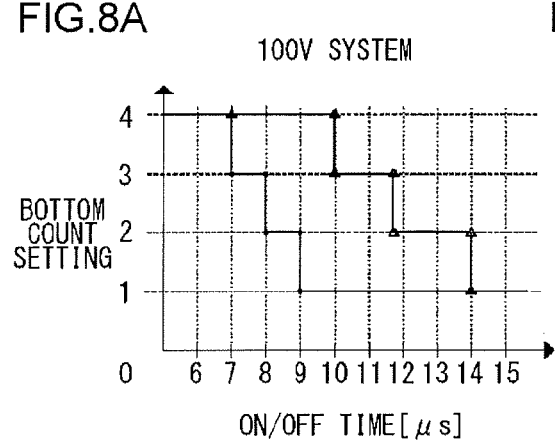
FIGS. 8A and 8B are diagrams showing the relation between the bottom count setting and the ON/OFF time for the 100 V system and the 200 V system, respectively.
Figure 8B:
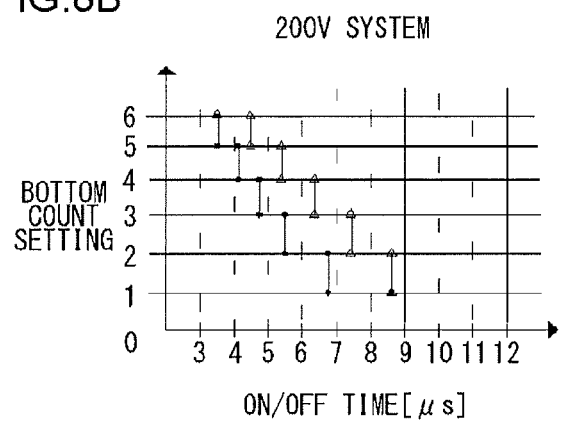

FIGS. 8A and 8B are diagrams showing the relation between the bottom count settings and the ON/OFF times set for the 100 V system and the 200 V system, respectively. For the 100 V system and the 200 V system, the bottom count settings are configured to have hysteresis.

Figure 9:
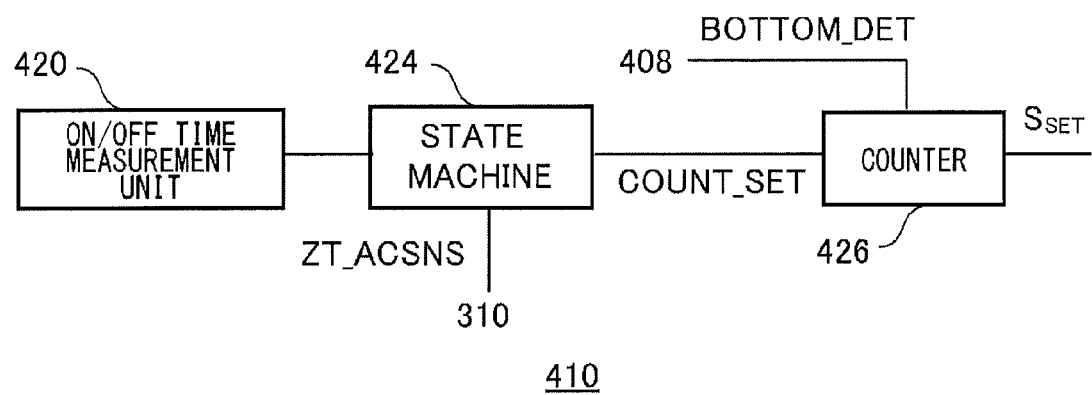
FIG. 9 is a circuit diagram showing an example configuration of a bottom count controller.

FIG. 9 is a circuit diagram showing an example configuration of the bottom count controller 410. The bottom count controller 410 includes an ON/OFF time measurement unit 420, a one-shot circuit 422, a state machine 424, and a counter 426.

The ON/OFF time measurement unit 420 is configured to measure the ON/OFF time, and to output a detection signal, which represents the ON/OFF time, to the state machine 424. The state machine 424 further receives the ZT_ACSNS signal as an input signal. The state machine 424 is configured to change the bottom count setting, i.e., COUNT_SET, based on the ZT_ACSNS signal and the ON/OFF time, as shown in FIGS. 8A and 8B.

The counter 426 is configured to count the number of times the bottom detection signal BOTTOM_DET is asserted. When the number of times the bottom detection signal BOTTOM_DET is asserted reaches the setting value COUNT_SET, the counter 426 asserts the set signal $S_{SET}$.

Returning to FIG. 7, the timeout circuit 412 is configured to generate a timeout signal TIME_OUT which is asserted after a predetermined time elapses after the bottom detection signal BOTTOM_DET is first asserted. The timeout signal TIME_OUT sets the upper limit of the off period of the switching transistor M1.

The OR gate 414 is configured to output, as the set signal $S_{SET}'$, a signal that is asserted first from among the set signal $S_{SET}$ received from the bottom count controller 410 and the timeout signal TIME_OUT.

The AND gate 416 is configured to mask the output signal of the OR gate 414 using the light load detection signal S_BURST. With such an arrangement, when a light load is connected to the DC/DC converter 10, the set signal $S_{SET}'$ is not asserted. In this state, the switching frequency is reduced, i.e., the mode is switched to the light load mode.

The SR flip-flop 460 is arranged such that the set signal $S_{SET}'$ is received via its set terminal, and the reset signal $S_{RST}$ is received via its reset terminal. The output Q of the SR flip-flop 460 is used as the pulse signal $S_{PWM}$.

The AND gate 462 is configured to generate the logical AND of the S_OVP signal (inverted logic signal), the pulse signal $S_{PWM}$, the reset signal $S_{RST}$, and the FBOLP_OH signal, and to output the logical AND, which will be referred to as the "$S_{PWM}'$ signal", to a downstream driver 104.

The above is the configuration of the control circuit 100.

With the control circuit 100, the bottom count setting is adaptively changed according to the input voltage $V_{IN}$, i.e., the commercial AC voltage $V_{AC}$. Thus, such an arrangement is capable of maintaining the switching frequency at a constant level, thereby suppressing audible noise.

Furthermore, irrespective of the range of the AC voltage $V_{AC}$, such an arrangement is capable of making uniform the range of change in the switching frequency. Such an arrangement is capable of solving a problem of increased idling power consumption and so forth.

The above is the operation of the control circuit 100.

Next, description will be made regarding the usage of the DC/DC converter 10.

The DC/DC converter 10 can suitably be employed in the inverter (power supply apparatus) 1 shown in FIG. 1. Furthermore, the inverter 1 can suitably be employed in various kinds of AC adapters, and power supply blocks included in various kinds of electronic devices.

Figure 10:
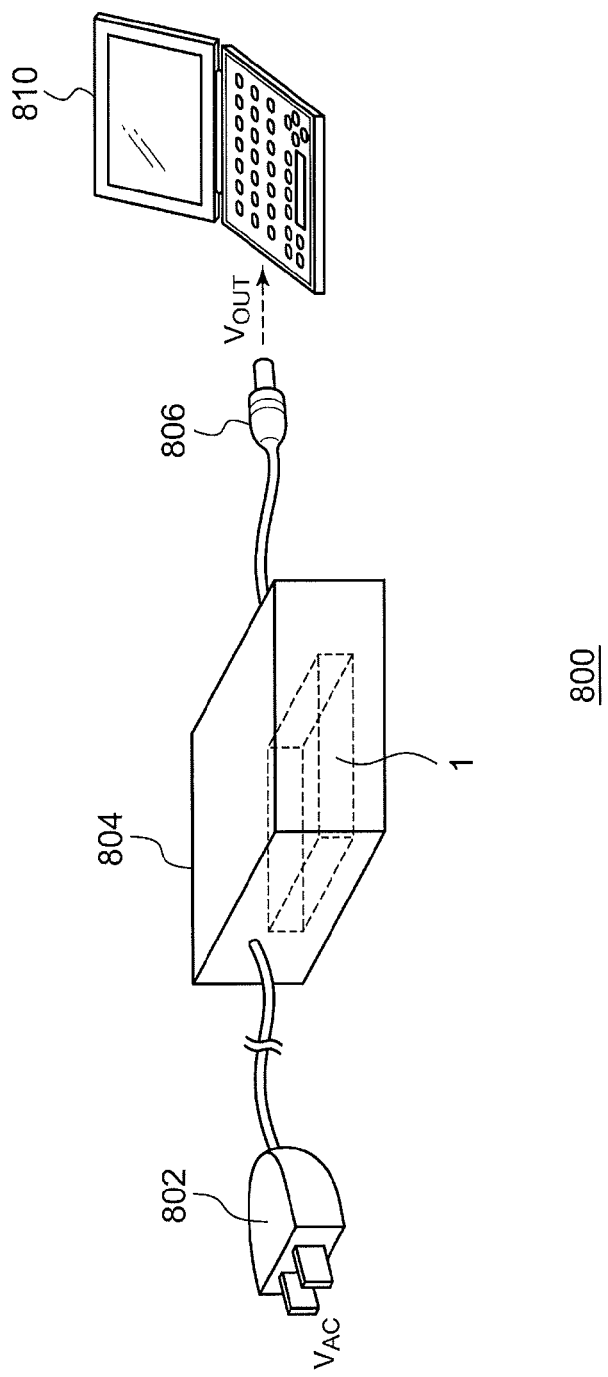
FIG. 10 is a diagram showing an AC adapter including an inverter.

FIG. 10 is a diagram showing an AC adapter 800 including the inverter 1. The AC adapter 800 includes a plug 802, a casing 804, and a connector 806. The plug 802 is configured to receive commercial AC voltage $V_{AC}$ from an unshown electrical outlet. The inverter 1 is mounted within the casing 804. The DC output voltage $V_{OUT}$ generated by the inverter 1 is supplied to an electronic device 810 via the connector 806. Examples of such an electronic device 810 include laptop PCs, digital still cameras, digital video cameras, cellular phone terminals, portable audio players, etc.

Figure 11A:
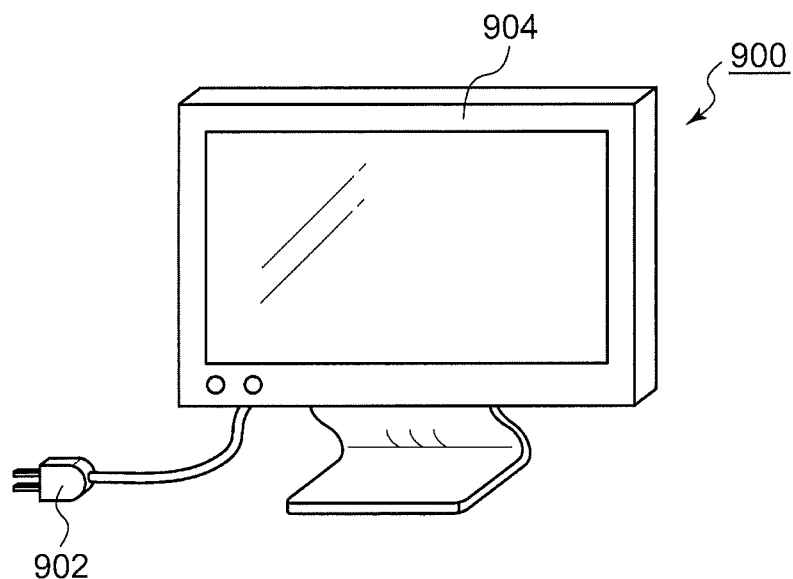
FIGS. 11A and 11B are diagrams each showing an electronic device including an inverter.
Figure 11B:
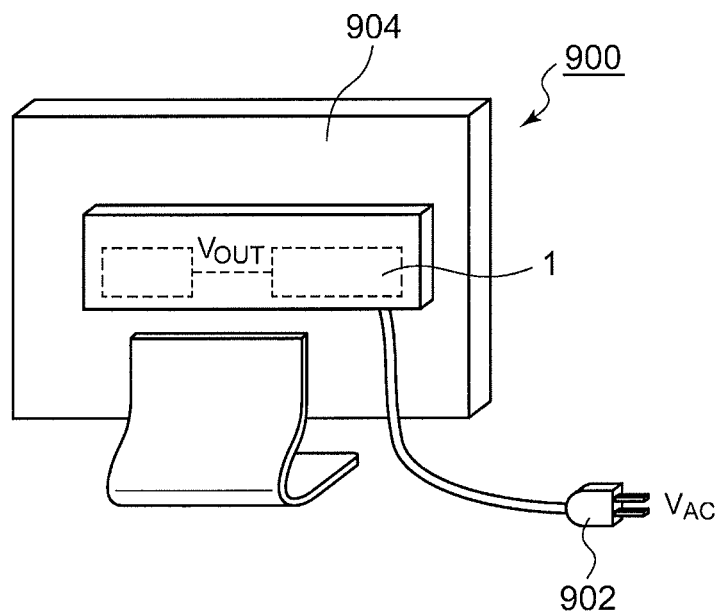

FIGS. 11A and 11B are diagrams each showing an electronic device 900 including the inverter 1. The electronic device 900 shown in FIGS. 11A and 11B is configured as a display apparatus. However, the electronic device 900 is not particularly restricted in kind, as long as it includes a power supply apparatus as an internal component. Examples of such an electronic device 900 include audio devices, refrigerators, washing machines, vacuum cleaners, etc.

A plug 902 is configured to receive commercial AC voltage $V_{AC}$ from an unshown electrical outlet. The inverter 1 is mounted within the casing 804. The DC output voltage $V_{OUT}$ generated by the inverter 1 is supplied to loads mounted within the same casing 904, examples of which include a microcomputer, DSP (Digital Signal Processor), power supply circuit, illumination device, analog circuit, digital circuit, etc.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiment regarding an arrangement in which the shunt regulator (error amplifier) 212 is provided on the secondary side of the transformer T1. Also, such an error amplifier may be provided on the primary side of the transformer T1. Also, such an error amplifier may be built into the control circuit 100.

As described above, the pulse modulator 102 is not restricted to a peak current mode pulse modulator. Also, the pulse modulator 102 may be configured as an average current mode pulse modulator.

Description has been made in the embodiment regarding an arrangement employing a positive logic (active high) system in which the assert state of each signal is associated with the high level, and the negate state of each signal is associated with the low level. Also, an arrangement may be made employing a negative logic system. Also, such an arrangement may employ a combination of the positive logic system and the negative logic system.

While the preferred embodiments of the present invention have been described using specific terms, such description is for illustrative purposes only, and it is to be understood that changes and variations may be made without departing from the spirit or scope of the appended claims.

What is claimed is:

1. A control circuit for a DC/DC converter, wherein the DC/DC converter comprises:
   a transformer comprising a primary winding, a secondary winding, and an auxiliary winding;
   a switching transistor arranged on a current path of the primary winding of the transformer; and
   a detection resistor arranged on a path of the switching transistor,
   and wherein the control circuit comprises:
   a feedback terminal configured to receive a feedback voltage that corresponds to an output voltage of the DC/DC converter;
   a current detection terminal configured to receive a detection voltage that develops at the detection resister;
   an auxiliary terminal configured to receive, as an input signal, a voltage at one end of the auxiliary winding;
   a pulse modulator configured to generate a pulse signal having a duty ratio that is adjusted according to the voltage at the aforementioned one end of the auxiliary winding, the detection voltage, and the feedback voltage, such that an output voltage of the DC/DC converter approaches a target value; and
   a driver configured to perform switching of the switching transistor according to the pulse signal,
   and wherein the pulse modulator comprises:
   a reset signal generating unit configured to generate a reset signal which is asserted according to the feedback voltage and the detection voltage; and a set signal generating unit configured to generate a set signal which is asserted according to the voltage at the auxiliary terminal, and wherein the pulse modulator is configured to generate a pulse signal which is switched to an on level that corresponds to an on state of the switching transistor when the set signal is asserted, and which is switched to an off level that corresponds to an off state of the switching transistor when the reset signal is asserted, and wherein the set signal generating unit comprises:
  a bottom detection comparator configured to compare the voltage at the auxiliary terminal with a predetermined threshold voltage, and to generate a bottom detection signal which is asserted every time the voltage at the auxiliary terminal crosses the threshold voltage; and
  a bottom count controller configured to determine a count setting value based on an ON/OFF time which is a period of time from a time point at which the pulse signal transits to the on level that corresponds to the on state of the switching transistor up to a time point at which the bottom detection signal is first asserted, and based on an input voltage level of the DC/DC converter, and to assert the set signal every time the number of times the bottom detection signal is asserted reaches the count setting value.

2. A DC/DC converter comprising:
a transformer comprising a primary winding, a secondary winding, and an auxiliary winding;
a switching transistor connected to the primary winding of the transformer;
a detection resistor arranged on a path of the switching transistor;
a first diode arranged such that its anode is connected to the secondary winding;
a first output capacitor having its one electrode grounded and its other electrode connected to the cathode of the first diode;
a second diode arranged such that its anode is connected to the auxiliary winding;
a second output capacitor having its one electrode grounded, and its other electrode connected to the cathode of the second diode;
a feedback circuit configured to generate a feedback voltage that corresponds to an output voltage that develops at the first output capacitor; and
a control circuit configured to receive the feedback voltage, and to perform switching of the switching transistor,
and wherein the control circuit comprises:
  a feedback terminal configured to receive the feedback voltage;
  a current detection terminal configured to receive a detection voltage that develops at the detection terminal;
  an auxiliary terminal configured to receive, as an input signal, a voltage at one end of the auxiliary winding;
  a pulse modulator configured to generate a pulse signal having a duty ratio that is adjusted according to the voltage at the aforementioned one end of the auxiliary winding, the detection voltage, and the feedback voltage, such that an output voltage of the DC/DC converter approaches a target value; and
  a driver configured to perform switching of the switching transistor according to the pulse signal, and wherein the pulse modulator comprises:
  a reset signal generating unit configured to generate a reset signal which is asserted according to the feedback voltage and the detection voltage; and
  a set signal generating unit configured to generate a set signal which is asserted according to the voltage at the auxiliary terminal, and wherein the pulse modulator is configured to generate a pulse signal which is switched to an on level that corresponds to an on state of the switching transistor when the set signal is asserted, and which is switched to an off level that corresponds to an off state of the switching transistor when the reset signal is asserted, and wherein the set signal generating unit comprises:
  a bottom detection comparator configured to compare the voltage at the auxiliary terminal with a predetermined threshold voltage, and to generate a bottom detection signal which is asserted every time the voltage at the auxiliary terminal crosses the threshold voltage; and
  a bottom count controller configured to determine a count setting value based on an ON/OFF time which is a period of time from a time point at which the pulse signal transits to the on level that corresponds to the on state of the switching transistor up to a time point at which the bottom detection signal is first asserted, and based on an input voltage level of the DC/DC converter, and to assert the set signal every time the number of times the bottom detection signal is asserted reaches the count setting value.

3. The DC/DC converter according to claim 2, wherein the feedback circuit comprises:
  a shunt regulator configured to generate a feedback signal having a level that is adjusted such that the difference between a voltage obtained by dividing the output voltage and a predetermined target value becomes zero; and
  a photocoupler comprising a primary-side light-emitting element configured to be controlled according to the feedback signal,
and wherein a signal generated by a secondary-side element of the photocoupler is supplied as the feedback voltage to the control circuit.

4. A power supply apparatus comprising:
a filter configured to perform filtering of a commercial AC voltage;
a diode rectifier circuit configured to perform full-wave rectification of an output voltage of the filter;
a smoothing capacitor configured to smooth an output voltage of the diode rectifier circuit, so as to generate a DC input voltage; and
the DC converter according to claim 2, configured to step down the DC input voltage, and to supply the DC input voltage thus stepped down to a load.

5. An electronic device comprising:
a load;
a filter configured to perform filtering of a commercial AC voltage;
a diode rectifier circuit configured to perform full-wave rectification of an output voltage of the filter;
a smoothing capacitor configured to smooth an output voltage of the diode rectifier circuit, so as to generate a DC input voltage; and
the DC converter according to claim 2, configured to step down the DC input voltage, and to supply the DC input voltage thus stepped down to the load.

6. A power supply adapter comprising:
a filter configured to perform filtering of a commercial AC voltage;

a diode rectifier circuit configured to perform full-wave rectification of an output voltage of the filter;
a smoothing capacitor configured to smooth an output voltage of the diode rectifier circuit, so as to generate a DC input voltage; and
the DC converter according to claim 2, configured to step down the DC input voltage so as to generate the DC output voltage.

* * * * *